United States Patent [19]
Robach

[11] 4,356,204
[45] Oct. 26, 1982

[54] COMPOUND AND METHOD FOR INHIBITING GROWTH OF SPOILAGE ORGANISMS

[75] Inventor: Michael C. Robach, St. Peters, Mo.

[73] Assignee: Monsanto Company, St. Louis, Mo.

[21] Appl. No.: 289,570

[22] Filed: Aug. 3, 1981

[51] Int. Cl.³ .............................................. A23L 3/34
[52] U.S. Cl. .................................... 426/321; 426/335; 426/532
[58] Field of Search .................. 426/321, 330–335, 426/532

[56] References Cited

U.S. PATENT DOCUMENTS

| 2,711,976 | 6/1955 | Castellani | 426/334 |
| 2,910,368 | 10/1959 | Melnick et al. | 426/335 X |
| 3,275,503 | 9/1966 | Marnett et al. | 426/335 X |
| 3,899,588 | 8/1975 | Skov et al. | 426/335 X |
| 4,247,569 | 1/1981 | Hata et al. | 426/335 |

*Primary Examiner*—Robert A. Yoncoskie
*Attorney, Agent, or Firm*—Robert E. Wexler; Howard C. Stanley

[57] ABSTRACT

Certain ketohexanoic acids are shown to inhibit growth of food poisoning and spoilage organisms.

14 Claims, No Drawings

COMPOUND AND METHOD FOR INHIBITING GROWTH OF SPOILAGE ORGANISMS

BACKGROUND OF THE INVENTION

This invention relates to novel compounds capable of inhibiting growth of food poisoning and spoilage organisms which decrease the storage life of food products which normally spoil or lose flavor. In particular, this invention is related to a method of inhibiting the growth of food poisoning and spoilage organisms.

Deterioration due to spoilage organisms occurs extensively in untreated foodstuffs such as bakery products, fish, meats, fruits, vegetables and dairy products. Industrial food processing plants incur losses both in the form of returned, deteriorated products and of impaired sales owing to inferior keeping quality of the products. Consumers, also, are caused direct losses by such deterioration but, in addition, they also run health risks because of the toxins formed by pathogens which may already be produced before the growth of such pathogens is observable. Heretofore, attempts have been made to prevent or inhibit the growth of food spoilage organisms by using packaging materials which have been treated by a variety of substances and by intensifying plant hygiene and thus reducing the amount of pathogen and food spoilage organisms infection. Intensified food plant hygiene has successfully lowered the frequency of food spoilage organisms to a significant degree, however, it is impossible, in practice, to solve the problem completely by this approach, since it has not been possible to reduce to a sufficiently low level the organism infection by which food is contaminated even by such expedients as filtration of intake air and ultraviolet light treatment.

Aerobic microorganisms are deposited on the surface of foods through post-processing contamination from the air, from the hands of an operator, from equipment and utensils and other means. Typical examples are the formation of slime on the surfaces of slaughtered animal carcasses, or the growth of bacterial colonies on sliced sausages.

Since post-processing microbial contamination, in most cases, remains on the surface of food or feed, aerobic microorganisms generally can multiply only on the superficial layers of the food or feed. Accordingly, the measures aimed at fighting such microorganisms are concentrated on the superficial layer and the desired preventative effect can thereby be achieved. The procedures applied heretofore for the purpose of applying chemical or equivalent inhibitors of microorganisms growth on the superficial layer of food products have been by dipping the food in a solution of chemical preservative, spraying a chemical preservative solution onto the surface of food or feed and impregnating packaging material with a chemical preservative. A wide variety of such chemical preservatives have heretofore been used.

For instance, U.S. Pat. No. 2,711,976 suggests the use of amino acids to increase the resistance of custard foods to spoilage organisms and Staphylococcus species. U.S. Pat. No. 2,898,372 suggests calcium acetate propionate as a bread treating composition. U.S. Pat. No. 2,866,819 suggests the use of sorbic acid as a preservative in foods. U.S. Pat. No. 2,910,368 discloses the use of EDTA with sorbic acid to increase the shelf life of vegetables. U.S. Pat. No. 2,992,114 suggests the use of sorbic acid and a mild heat treatment for the preservation of fruits and vegetables. In a paper published in Applied Microbiology, Volume 18, pages 68–75 (July, 1969), Preonas et al reported on the use of a mixture of sorbic acid and propionic acid to retard the growth of S. aureus on the surfaces of custard pies.

In accordance with the present invention, there is described and claimed a method of inhibiting the growth of pathogenic and spoilage organisms by treating same with ketohexanoic acids.

SUMMARY OF THE INVENTION

The present invention describes the use of ketohexanoic acids to inhibit the growth of food poisoning and spoilage organisms.

The present invention comprises broadly suppressing common pathogens and food spoilage organisms which render food products unpalatable or unsafe to eat after a finite period of time.

The means for accomplishing the purpose of this invention comprises treating food products with a ketohexanoic acid. Especially preferred are the 4- and 5-ketohexanoic acids. Members of this group of compounds which would be expected to inhibit the growth of microorganisms are represented by the formulas:

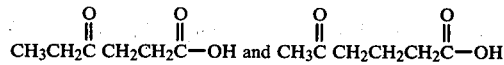

wherein one or more hydrogen atoms may be replaced by a substituted or unsubstituted alkyl substituent of up to 10 carbon atoms. Such substituent may represent methyl, ethyl, propyl, butyl, amyl, hexyl, heptyl, octyl, nonyl and decyl substituents. Such substituents may be either straight- or branched-chain and may, themselves, contain substituents which are not inconsistent with the antimicrobial action of the compounds in a food environment. Additionally, it is contemplated that the alkali, alkaline earth and ammonium salts of such acids would be effective inhibitors.

The preparation of 4- and 5-ketohexanoic acids is known in the literature. Thus, 4-ketohexanoic is prepared by addition of propionaldehyde to dimethyl maleate according to the procedure of T. M. Patrick [J. Org. Chem., 17, 1009 (1952)] and hydrolysis of the intermediate α-propionylsuccinate with aqueous acid. The preparation of 5-ketohexanoic acid is in accordance with the method of F. Korte and H. Machleidt [Ber. 88, 1676 (1955)]

It is contemplated that the application of the described ketohexanoic acids to a food product would be by dipping or otherwise immersing the food product in the acid or by spraying the acid onto the food product.

Among the microorganisms against which the ketohexanoic acids are contemplated as being effective as growth inhibitors are the nonlactic acid gram positive bacteria such as S. aureus, Bacillus cereus and Clostridium botulinum, Clostridium perfringens and other clostridial species and the Micrococcus species. Additionally, the ketohexanoic acids are contemplated to be effective growth inhibitors of gram negative bacteria such as Salmonella species, E. coli, V. parahemolyticus and species of Pseudomonas, Alcaligines and Flavobacterium. Futhermore, the ketohexanoic acids are contemplated to be a growth inhibitor, although to a lesser extent than with microorganisms, against yeasts such as Candida albicans, Saccharomyces cerevisiae and against molds such as Aspergillus, *Penicillim italicum* and *Fusarium roseum*. Among the food products which would be particularly benefited by treatment with ketohexanoic acids are foods which have high water activity and which are subject to temperature abuse, i.e. improper storage and transportation temperature conditions. Examples of such foods are packaged meat products, dairy products, prepared salad products and prepared entree products of all types.

Among feed products which may be benefited by treatment with ketohexanoic acids are those byproduct feeds which are subject to pathogen attack, e.g. fishmeal, poultry byproduct meal and rendered animal wastes.

The concentration of ketohexanoic acids which is contemplated as being effective in the treatment of food or feed products is generally in the range of from about 0.005% to about 0.5%, more particularly from about 0.05% to about 0.3% and, especially, from about 0.1% to about 0.2% based on the weight of the substrate. The specific concentration of acid with which a particular microorganism is treated will vary, depending upon the specific microorganism, its environment and substrate and the presence of other preservative agents.

EXAMPLES OF PREFERRED EMBODIMENTS

In the Table, 4-ketohexanoic acid was tested for antimicrobial activity against *Salmonella infantis*, a common gram negative food poisoning bacteria. The testing was conducted at pH 5 in trypticase soy broth at 37° C. The growth of the bacteria was monitored using standard spectrophotometric methods daily for six days. The results are reported in the Table as optical density (i.e. absorbence at 550 nanometers). The values are approximate, having been transposed from graphic form. The results indicate that 4-ketohexanoic acid is an effective inhibitor of *S. infantis*.

TABLE

| | *Salmonella infantis* 10,000 cells/ml Absorbence at 550 Nonometers | | | | | | |
|---|---|---|---|---|---|---|---|
| Additive | 0 Days | 1 Day | 2 Days | 3 Days | 4 Days | 5 Days | 6 Days |
| Control | 0.1 | 0.8 | 0.9 | 0.8 | 0.8 | 0.8 | 0.8 |
| 0.1% 4-keto-hexanoic acid | 0.0 | 0.0 | 0.0 | 0.4 | 0.5 | 0.6 | 0.6 |

We claim:

1. Method of inhibiting growth of food poisoning and spoilage microorganisms in food which comprises contacting food containing said mircroorganisms with an effective growth inhibiting amount of a ketohexanoic acid having the formula

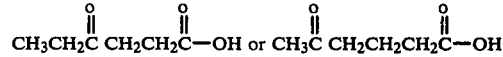

wherein one or more hydrogen atoms may be replaced by a substituted or unsubstituted alkyl group having up to 10 carbon atoms and salts thereof.

2. Method of claim 1 wherein said microorganism is *S. infantis*.

3. Method of claim 2 wherein said acid is 4-ketohexanoic acid.

4. Method of claim 1 wherein said effective growth inhibiting amount of said acid is from 0.005% to about 0.5% based on the weight of the food.

5. Method of claim 1 wherein said amount is from about 0.05% to about 0.3%.

6. Method of claim 1 wherein said amount is from about 0.1% to about 0.2%.

7. Method of claim 3 wherein said amount is 0.1%.

8. Method of claim 1 wherein said acid is 5-ketohexanoic acid.

9. Method of inhibiting the growth of food poisoning and spoilage yeasts in food which comprises contacting food containing said microorganisms with an effective growth inhibiting amount of ketohexanoic acid having the formula

wherein one or more hydrogen atoms may be replaced by a substituted or unsubstituted alkyl group having up to 10 carbon atoms and salts thereof.

10. Method of claim 9 wherein said acid is a 4-ketohexanoic acid.

11. Method of claim 9 wherein said acid is a 5-ketohexanoic acid.

12. Method of inhibiting the growth of food poisoning and spoilage molds in food which comprises contacting food containing said microorganisms with an effective growth inhibiting amount of a ketohexanoic acid having the formula

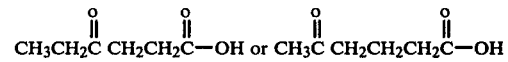

wherein one or more hydrogen atoms may be replaced by a substituted or resubstituted alkyl group having up to 10 carbon atoms.

13. Methods of claim 12 wherein said acid is a 4-ketohexanoic acid.

14. Method of claim 12 wherein said acid is a 5-ketohexanoic acid.

* * * * *